MAGNETIC MEMORY ELEMENT

Filed Feb. 13, 1961 3 Sheets-Sheet 1

INVENTOR.
RICHARD L. MOORE
BY
[signature]
ATTORNEY

INVENTOR.
RICHARD L. MOORE
BY
Herbert F. Sommermeyer
ATTORNEY

June 25, 1963 R. L. MOORE 3,095,555

MAGNETIC MEMORY ELEMENT

Filed Feb. 13, 1961 3 Sheets-Sheet 3

INVENTOR.
RICHARD L. MOORE
BY
Herbert F. Somermeyer
ATTORNEY

United States Patent Office 3,095,555
Patented June 25, 1963

3,095,555
MAGNETIC MEMORY ELEMENT

Richard L. Moore, Minneapolis, Minn., assignor to Sperry Rand Corporation, New York, N.Y., a corporation of Delaware Filed Feb. 13, 1961, Ser. No. 88,789
26 Claims. (Cl. 340—174)

This invention relates to the nondestructive readout or sensing of the state of the remanent magnetization of magnetic cores.

The value of the utilization of small cores of magnetic material as logical memory elements in electronic data processing systems is well known. This value is based upon the bistable characteristics of magnetic cores which include the ability to retain or remember magnetic conditions which may be utilized to indicate a binary bit "1" or a binary bit "0." As the use of magnetic cores in electronic data processing equipment increases, a primary means of improving the computational speed of these machines is to utilize memory elements which possess the property of nondestructive readout, for by retaining the initial state of remanent magnetization after readout the rewrite cycle required with destructive readout devices is eliminated. As used herein the term "nondestructive readout" shall refer to the sensing of the relative direction or state of the remanent magnetization of a magnetic core without destroying or reversing such remanent magnetization. This should not be interpreted to mean that the state of the remanent magnetization of the core being sensed is not temporarily disturbed during such nondestructive readout.

Ordinary magnetic cores and circuits utilized in destructive readout devices are now so well known that they need no special description herein, however, for purposes of the present invention, it should be understood that such magnetic cores are capable of being magnetized to saturation in either of two directions. Furthermore, these cores are formed of magnetic material selected to have a rectangular hysteresis characteristic which assures that after the core has been saturated in either direction a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation denoting a binary "0." One or more output coils are usually provided to sense when the core switches from one state of saturation to the other. Switching can be achieved by passing a current pulse of sufficient magnitude through the input winding in a manner so as to set up a magnetic field in the area of the magnetic core in the sense opposite to the pre-existing flux direction, thereby driving the core to saturation in the opposite direction of polarity, i.e., of positive to negative saturation. When the core switches the resulting magnetic field variation induces a signal in the other windings on the core such as, for example, the above-mentioned output or sense windings. The magnetic material for the core may be formed of various magnetic materials such as those known as Mumetal, permalloy, or the ferromagnetic ferrites, such as that known as Ferramic.

The present invention may be utilized to sense the state of a core nondestructively whether the core is being used individually or as one of a plurality thereof such as in shifting registers, memory matrices, translators, or the like. This invention may be used to its best advantage when the core which is to be sensed by nondestructive readout is a magnetic film core such as formed by the evaporation or deposition process disclosed and claimed in patent Number 2,900,282 granted to S. M. Rubens and assigned to the assignee of this application. This application shall proceed relative to the use of such magnetic films, however, no limitation to magnetic film cores of the type disclosed in the above patent is intended. The term "magnetic film core" shall refer to magnetic cores of the thin film type which exhibit single domain magnetic characteristics providing single domain rotational switching. Such magnetic film cores may, or may not, possess the property of uniaxial anisotropy. The use of such magnetic film cores in single element circuits and in multi-element circuits such as memory matrices is disclosed and claimed in the co-pending application of Rubens et al., Serial No. 626,945, filed December 7, 1956, now Patent Number 3,030,612, and assigned to the assignee of this application. In the above referenced Rubens' patent there is a teaching of the evaporation and deposition of magnetic material on a substrate to form a very thin film having geometric and magnetic characteristics which may be closely controlled. In the latter referenced application the use of a deposited film in conjunction with windings in the form of flat conductors or printed circuits is taught. The co-pending application of Pohm et al., Serial No. 722,584, filed March 19, 1958 and assigned to the assignee of this application adds to these applications the use of a second core preferably of the thin film type disposed adjacent to the first core with the coercivity of the second core being substantially less than the coercivity of the first core. Under such circumstances the currents to the core windings may be regulated so that the first core will not switch upon the application of a given interrogating field, but the second core will switch or not, according to its magnetic state to cause an output signal which indicates the magnetic state of the first core.

In the above referenced co-pending Pohm et al. application there is shown an apparatus for the nondestructive readout of magnetic cores. This co-pending application utilizes two magnetic cores designated the information core and the readout core. Both of these cores preferably exhibit single domain magnetic properties providing single domain rotational switching and preferably possessing the characteristic of uniaxial anisotropy so as to provide a magnetic axis along which the core's magnetization vector shall reside when the external magnetizing force in the area of the magnetic core concerned is substantially zero. This combination of the magnetic characteristics is capable of providing magnetic cores having the fastest of switching characteristics and having the highest producibility individually or as a plurality thereof when making up shifting registers, memory matrices, translators or the like.

The preferred embodiment of the above referenced application utilizes an information core which is the element in which data is stored as a binary "1" or "0" which binary "1" or "0" is denoted by the remanent magnetization vector thereof having a magnetic sense arbitrarily designated as being in the positive or negative state. The information core is preferably of such geometry and material that it exhibits coercivity substantially greater than that of the readout core. The readout core is the core that is either switched or not switched by an interrogating pulse depending upon the data stored in the information core. This switching or non-switching of the readout core is indicative of the binary data stored in the information core. The information core further provides an external remanent magnetic field substantially larger than that of the readout core, such that the readout core is coerced by the information core's external remanent magnetic field to follow the magnetic state of the information core. The relative coercivities of these two cores are such that an interrogating pulse sets up a substantial magnetic field in the area of the readout core which switches the readout core, but an insubstantial magnetic field in the area of the information core which does not switch the information core. The term "switch" when used in this application shall mean driving the magnetic state of the core concerned from a point along the substantially horizontal portion of its hysteresis characteristic loop to a point substantially into its high permeability area or into its opposite state of magnetization, i.e., from positive to negative saturation. The arrangement of these two cores is such that in the area of the readout core the magnetic field set up by the interrogating pulse is additive to or subtractive from the external remanent magnetic field set up by the information core. If in the area of the readout core the external remanent magnetic field set up by the information core is additive to the magnetic field set up by the interrogating pulse the readout core is merely driven further into saturation and a consequent change in magnetic field thereabout is negligible. This driving of the readout core's magnetic state further into saturation with resulting negligible change in magnetic field thereabout results in a negligible output signal being developed in a sense line. Conversely, if in the area of the readout core the external remanent magnetic field set up by the information core is subtractive from the magnetic field set up by the interrogating pulse, the magnetic field set up by the interrogating pulse having a substantially greater effect on the readout core than the external remanent magnetic field of the information core, the readout core's magnetization vector is driven from its positive remanent magnetic state and reversed into its negative remanent magnetic state. Upon cessation of the interrogating pulse the effect of the external remanent magnetic field set up by the information core in the area of the readout core again takes effect and returns the readout core's magnetization vector to its initial positive remanent magnetic state associated with a stored binary "1" in the information core. This driving or switching of the readout core's magnetization vector from a first magnetic state to a second magnetic state and the consequent substantial change in magnetic field thereabout results in a relatively large output signal being developed in a sense line.

This invention is an improvement of the above described application of Pohm et al., Serial No. 722,584, filed March 19, 1958, and involves the combination of the two core element of the above application with a third core. Essentially this invention incorporates a third core in the above described two core element to provide a static bias field about the readout core which permits the utilization of a substantially smaller interrogate pulse with the resulting improvement in readout characteristics, power requirements, and producibility. The savings in power requirements are indicated by the utilization of an interrogate pulse which sets up a magnetic field in the area of the readout core of approximately 4 oersteds as compared to the above discussed Pohm et al. application which operates in its preferred embodiment in a matrix array with a field intensity of approximately 6 oersteds, a 33 percent reduction of interrogate pulse power requirements.

It is therefore a primary objective of this invention to provide an improved apparatus for permitting the nondestriuctive readout of a magnetic core.

Another object of this invention is to provide a magnetic memory apparatus comprising three cores, wherein the remanent magnetic state of a first core may be sensed without the destruction of the remanent magnetic state of said first core, while a second core switches its magnetic state.

Another object of this invention is to provide a three core magnetic memory apparatus each core having differing coercivities and differing external remanent magnetic field intensities.

Another object of this invention is to provide a magnetic memory apparatus comprising three magnetic film cores wherein the external remanent magnetic field of a first core magnetically biases a second core.

Still another object of this invention is the provision in a three core memory apparatus of an interrogating magnetic field which switches one of said cores only when another of said cores is in a pre-determined magnetic state.

It is a further object of this invention to provide a magnetic memory apparatus which exhibits nondestructive readout and which requires only the usual windings of a coincident current magnetic memory system.

These and other more detailed and specific objectives will be disclosed in the course of the following specification, reference being had to the accompanying drawings in which.

Figures 1, 2:
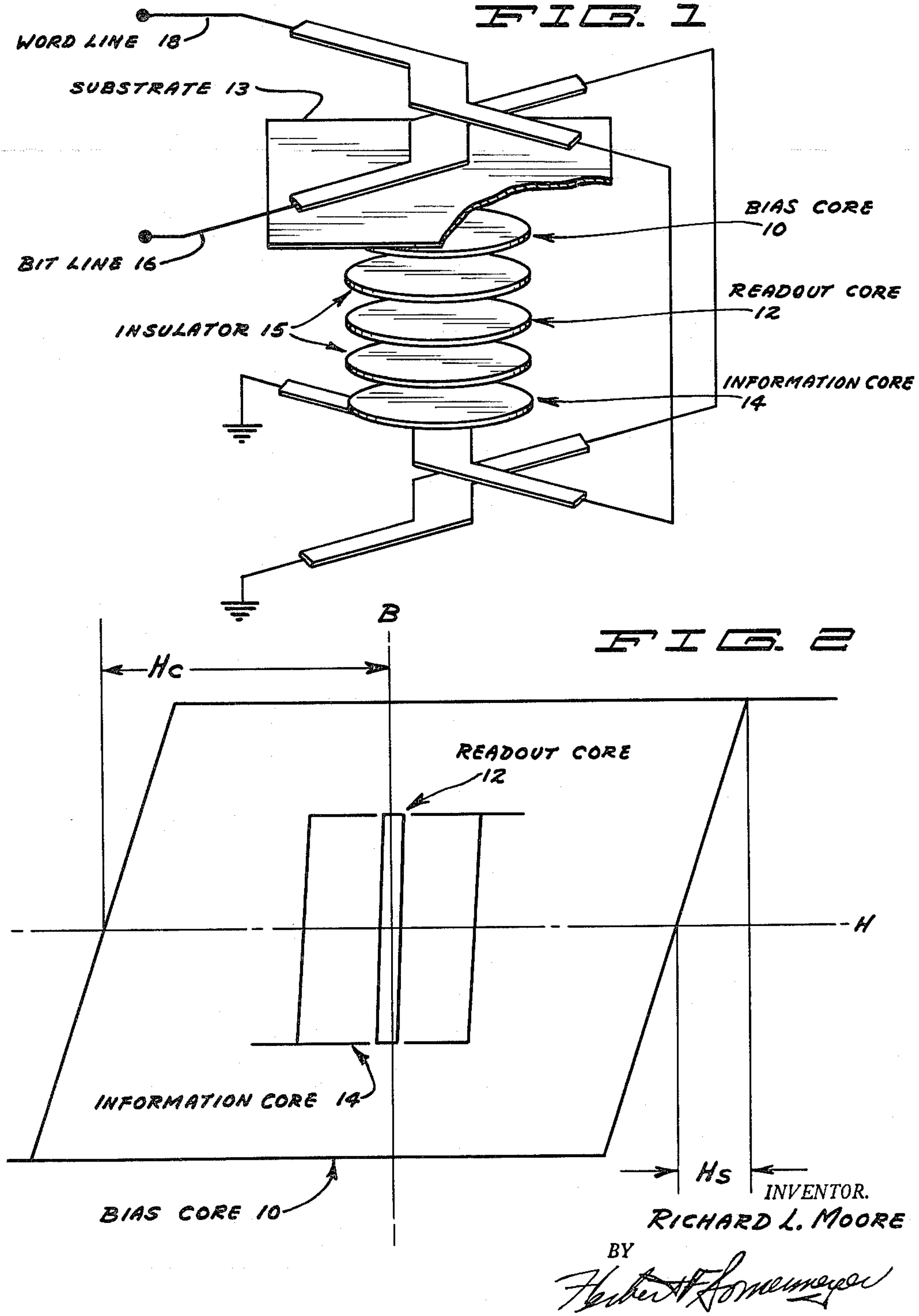
FIGURE 1 is an illustration of a three core magnetic memory element.
FIGURE 2 is an illustration of the relative hysteresis characteristics of the three magnetic cores of FIGURE 1.

This invention is an improvement of the above described application of Pohm et al., Serial No. 722,584, filed March 19, 1958, and involves the combination of the two core element of the above application with a third core. Essentially this invention consists of a three core magnetic element, each core preferably of the magnetic film type which exhibits single domain magnetic properties providing single domain rotational switching and preferably possessing the characteristic of uniaxial anisotropy so as to provide an axis along which the core magnetic vector shall reside when the external magnetizing force in the area of the magnetic core concerned is substantially zero. These three cores are designated, the information core, the readout core, and the bias core, with the bias core having the highest coercivity, the readout core having the lowest coercivity, and the information core having an intermediate coercivity. The three cores shall be of such material and geometry that the external remanent magnetic field set up by the bias core in the area of the readout core shall establish the magnetic state of the readout core at such a point along the substantially horizontal portion of its hysteresis loop such that if the external remanent magnetic field set up by the informaion core in the area of the readout core is of the opposite magnetic sense to that of the bias core the magnetic field set up by the interrogate pulse shall drive the magnetic state of the readout core into its area of high permeability.

An interrogating pulse shall set up a magnetic field in the area of the readout core such that with a binary "1" stored in the information core such field shall be of sufficient magnitude to drive the readout core towards its opposite magnetic state causing a relatively large flux variation throughout the readout core which in turn induces a relatively large output signal in a sense line which is indicative of a stored binary "1." With a binary "0" stored in the information core, such field shall merely drive the magnetic state of the readout core along the substantially horizontal portion of its hysteresis loop. A result of this action is a negligible flux variation throughout the readout core which in turn induces a negligible output signal in a sense line which is indicative of a stored binary "0." The function of the bias core is to set up a magnetic bias field in the area of the readout core so as to establish the magnetic state of the readout core at some point along the substantially horizontal portion of its rectangular hysteresis loop such that if the magnetic field set up by the information core in the area of the readout core is subtractive, denoting a stored binary "1," the readout core's magnetic state shall be driven into its area of high permeability toward its opposite magnetic state, i.e., from positive toward negative saturation, by the magnetic field set up by the interrogate pulse in the area of the readout core. Conversely, if the magnetic field set up by the information core in the area of the readout core is additive, denoting a stored binary "0," the readout core's magnetic state will merely move along the substantially horizontal portion of its rectangular hysteresis loop but not substantially into its area of high permeability.

The geometrical arrangement and magnetic state of the three cores of the illustrated embodiment and any associated lines should be such that:

*a.* The bias core shall be permanently magnetized in one of its two remanent magnetic states with its external remanent magnetic field in the area of the readout core arbitrarily assumed to be that of positive remanence. The term "permanently magnetized" means that the magnetic state of the bias core shall be initially established in one of its two remanent magnetic states and its coercivity shall be such that said established magnetic state shall never be substantially altered by a magnetic field set up by any normal or expected operating signal.

*b.* The information core shall establish an external remanent magnetic field in the area of the readout core such that with a stored binary "1" the external remanent magnetic field in the area of the readout core shall be arbitrarily assumed to be that of negative remanence and subtractive from that of the bias core, and with a stored binary "0" the external remanent magnetic field in the area of the readout core shall be arbitrarily assumed to be that of positive remanence and additive to that of the bias core.

*c.* The external remanent magnetic fields set up by the bias core and the information core in the area of the readout core shall be of such intensities that with such fields subtractive, the magnetic field set up by an interrogate pulse in the area of the readout core shall drive the magnetic state of the readout core into its area of high permeability toward its opposite magnetic state, i.e., from positive to negative remanence; with such fields additive the magnetic field set up by an interrogate pulse in the area of the readout core shall merely move the magnetic state of the readout core along the substantially horizontal portion of its hysteresis loop but not substantially into its area of high permeability.

*d.* Write signals shall set up a magnetic field in the area of the information core of such intensity as to establish the proper magnetic state of the information core so as to store a binary "1" or "0," but shall not materially affect the magnetic state of the bias core.

*e.* Interrogate pulses shall always be of the same polarity so as to set up a magnetic field in the area of the readout core of the opposite magnetic sense to or subtractive from that set up by the bias core.

*f.* Anisotropic axes of the three cores shall be substantially parallel.

With these general rules in mind the following basic operations are discussed in more detail as follows:

WRITE OPERATION

A write signal of the proper magnitude and polarity such as to set the information core into the desired state is applied to a write line. The magnetic field set up by the write signal is such that it will not affect the remanent magnetic state of the bias core and it may or may not affect the remanent magnetic state of the readout core. Upon cessation of the write operation the readout core is coerced to assume a state of magnetic alignment with the external remanent magnetic field set up by the information core in the area of the readout core. In the preferred embodiment with a binary "1" stored in the information core the external remanent magnetic field set up by the information core in the area of the readout core is of an opposite magnetic sense, i.e., subtractive, from that of the external remanent magnetic field set up by the bias core in the area of the readout core. Conversely, with a binary "0" stored in the information core the external remanent magnetic field set up by the information core in the area of the readout core is of the same magnetic sense, i.e., additive to that of the external remanent magnetic field set up by the bias core in the area of the readout core.

READ OPERATION

An interrogate pulse of the proper magnitude and polarity to switch the readout core is applied to the interrogate line. This pulse is of such magnitude and polarity as to set up a magnetic field in the area of the readout core which is of sufficient magnitude to switch the magnetic state of the readout core if the information core contains a binary "1," but not if it contains a binary "0," and also not to appreciably affect the magnetic state of the information core or the bias core. As the interrogate pulse subsides with a binary "1" stored in the information core the readout core switches back to magnetic alignment with the information core. This switching of the magnetic state of the readout core results in a relatively large flux variation throughout the readout core which in turn produces a relatively large output signal in the sense line which is indicative of a stored binary "1." With a stored binary "0" in the information core the readout core does not switch its magnetic state which results in a relatively small flux variation throughout the readout core which in turn induces a relatively small output signal in the sense line which is indicative of a stored binary "0."

It is appropriate to note that the parameters effecting magnetic film core performance are both variable and controllable so as to provide the designer with an innumerable number of combinations from which the magnetic memory element disclosed by this specification may be fabricated. A partial list of such parameters would include:

*a.* Coercive field
*b.* Anisotropy constant c. Saturation flux density
d. Rotational switching limit
e. Angle of dispersion
f. Switching time
g. External remanent magnetic field As noted in the general description of the operation of this invention the characteristics of relative coercivities and exernal remanent magnetic fields of the cores of the preferred embodiment are of prime importance.

The above parameters are complex functions of many variables including core:

a. material
b. thickness
c. width
d. length
e. material homogeneity
f. material heat treatment
g. orientation field strength and incidence during deposition, evaporization, or plating.

Thus external remanent magnetic field intensity may be increased by increasing film thickness, by changing material, or by heat treatment. Similarly, the change of such variables may affect any of the parameters noted above. Thus the particular geometries, materials, and treatments of the cores discussed in the preferred embodiment are illustrative only with no restriction of this invention to the particular embodiment as illustrated to be implied, A preferred embodimen of this invention is illustrated in FIGURE 1 wherein there is shown a magnetic element mounted on a suitable substrate and consisting of three magnetic cores insulated from each other by layers of non-magnetic material. As noted above a description of this invention shall be related to the illustrated embodiment which utilizes magnetic film cores similar to those formed in accordance with the aforementioned Patent Number 2,900,282, granted to S. M. Rubens.

Figure 5:
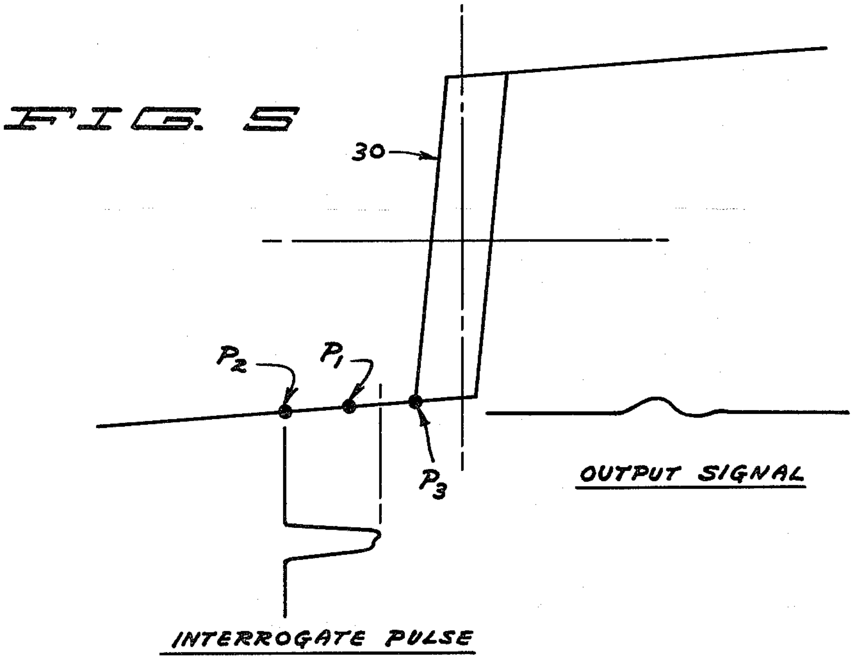
FIGURE 5 is an illustration of the operation of the element of FIGURE 1 with a stored binary "0" in the information core.
Figure 6:
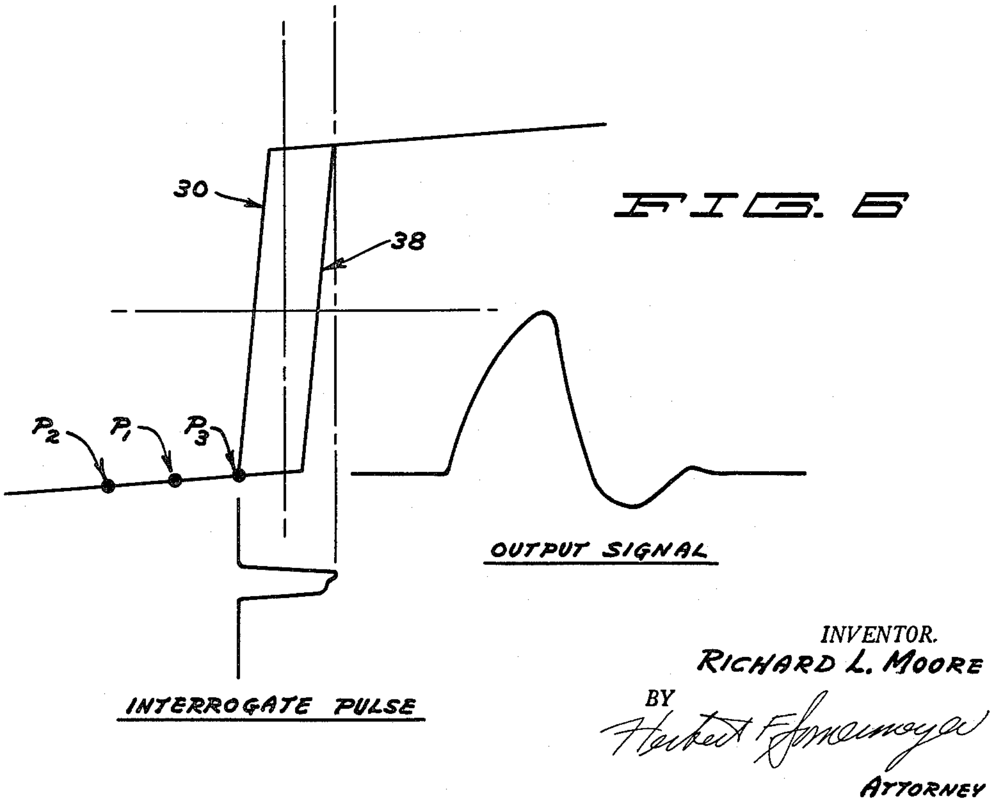
FIGURE 6 is an illustration of the operation of the element of FIGURE 1 with a stored binary "1" in the information core.

Bias core 10 is the core which establishes a bias magnetic field in the area of readout core 12 so as to provide an operating point, point $P_1$ of FIGURES 5 and 6, about which the magnetic fields set up by the information core 14 and the interrogate pulse vary the magnetic state of core 12. Information core 14 is the core which experiences nondestriuctive readout of binary information stored in a first or second of its magnetic states while readout core 12 is the core that is switched or not switched depending upon the binary information stored in core 14. As indicated herein magnetic films may be formed on a substrate 13 which may be glass or any other suitable material. The illustrated embodiment of FIGURE 1 indicates successive formation of core 10, insulator 15, core 12, insulator 15, and core 14 upon substrate 13, however no limitation to this particular structure is intended nor to be implied. Insulator 15 may be silicon monoxide or any other suitable material of a non-magnetic nature. Alternatively, the magnetic film cores may be formed on separate substrates and placed in juxtaposition with each other with the insulating means consisting of the substrate or mylar or any other suitable material. Any substantial variation in juxtaposition between the magnetic film cores may be compensated for by adjustment of the core material, geometry, or heat treatment.

The cores and insulators of FIGURE 1 are illustrated as being circular in shape, but no restriction in geometry is intended herein as cores of this type may be of any shape or contour, even permitting non-planar forms. Further, the cores and insulators are illustrated as being of substantial thickness and width, however, no such implication is intended as the preferred embodiment is of the nature of 0.05 inch (IN) in diameter and 2500 angstrom units (A.) in thickness. These dimensions may vary within certain practical limits, as, for example, it has been determined empirically that below film thicknesses of 10 microns in many magnetic materials there is no appreciable change in film switching speeds with increasing switching field intensity. Further, the non-homogeneous structure of extremely thin films destroys homogeneous single domain rotational switching characteristics.

In the article title, "Flux Reversal by Noncoherent Rotation in Magnetic Films," K. J. Harte, Journal of Applied Physics Supplement, vol. 31, No. 5, pages 283S—284S, May 1960, there is discussed the variation of the axis of planar anisotropy from point to point in the film plane. This variation or dispersion of the magnetization vector M associated with magnetic films possessing the property of uniaxial anisotropy may be utilized in this invention to aid in the rotational switching of magnetic films when subjected to longitudinal magnetic fields substantially parallel to the mean magnetization vector, M.

In the article title "Magnetic Film Memories, a Survey," Pohm et al., IRE Transactions on Electronic Computers, pages 308–314, September 1960 there is discussed the general problems associated with magnetic film parameters and the effect of magnetic film core variables on such parameters. It is here noted that the particular film used should be sufficiently thin to prevent domain wall movement in the thin direction as domain wall movement would permit the easiest mode of magnetic switching and would thus have a lower coercivity than single domain switching in the plane of the film.

Additionally, the importance of non-magnetic inclusions in the modification of domain wall energy, particularly with magnetic fields of low intensity and the effect of stress centers, particularly with magnetic fields of high intensity, is to be noted. Generally then, the particular film utilized should be sufficiently thin to prevent wall motion switching in the thin direction and sufficiently thick to permit homogeneous single domain rotational switching.

If domain wall motion is excluded and the magnetic film exists as a single domain and switches as a whole, in order to obtain two well-defined magnetic states with a sharp transistion threshold between them, the film should have some form of uniaxial anisotropy. The importance of the constant of anisotropy, K, is therefore to be noted.

Although the coercivity of the readout core, $H_c$, is required to be fairly small, too small a value would lead to difficulties from stray fields such as the earth's magnetic field and from demagnetizing effects. Too high a value of $H_c$ makes it difficult for circuit designers to produce the required fields economically. Values of $H_c$ of the order of one oersted are a reasonable compromise. With films possessing an $H_c$ of this magnitude and having a thickness up to 3000 A. and a diameter of one centimeter (CM), demagnetizing effects on the plane of the film are negligible, with increasing thickness tending to increase the shear factor, $H_s$.

Bit line 16 and word line 18 are illustrated in the preferred embodiment as having their magnetic axes in the area of the magnetic cores substantially parallel to the anisotropic axes of said three cores, however, no such restriction is intended. In the preferred embodiment of FIGURE 1 switching of the cores is accomplished through the concept of longitudinal field switching, i.e., the flux of the magnetic field produced by a current flowing through said lines is substantially parallel to the anisotropic axes, M., of said cores. The anisotropic axis of a magnetic film core is a magnetic vector and is subject to spatial dispersion which results in a plurality of magnetic vectors occupying a range of positions of several degrees about the mean vector M. This angle of dispersion is a magnetic film parameter which may be utilized to provide rotational switching with applied longitudinal fields. However, line 16 or 18 may be set with its magnetic axis askew or substantially non-parallel to the anisotropic axis of the readout core to provide transverse field switching. In the preferred embodiment during the initiation of the switching operation a slight rotation of the magnetization vector M or nucleation of the magnetic field occurs which results in a transverse field switching action from the applied longitudinal field.

FIGURE 2 is an illustration of the relative hysteresis characteristics of the three magnetic cores making up the magnetic memory element of the illustrated embodiment of FIGURE 1. These characteristics were obtained with the relative values of Table A of the materials of the magnetic memory element utilized in the illustrated embodiment.

*Table A*

| Parameter | $H_c$ | $H_s$ | B | Material | Dia. (inch) | Thick, A. |
|---|---|---|---|---|---|---|
| Core: | | | | | | |
| Bias | 40 | 5 | 2 | 90 Co—10 Fe | 0.05 | 2,500 |
| Information | 12 | 2 | 1 | 82 Ni—18 Fe | 0.05 | 2,500 |
| Readout | 1 | 1 | 1 | 82 Ni—18 Fe | 0.05 | 2,500 |
| Insulator | | | | SiO | 0.05 | 2,500 |

It is to be noted that a readout core permitting minimum shearing of the hysteresis characteristic, denoted by $H_s$ in Table A, is utilized in the illustrated embodiment to create a maximum flux change in the readout core with a minimum magnetic field variation set up by the interrogate pulse. This characteristic permits the utilization of a minimum interrogating pulse to obtain a detectable output signal level with a high signal to noise ratio associated with a stored binary "1," and a low output signal level associated with a stored binary "0."

Although the illustrated embodiment of this invention utilizes magnetic film cores whose axes of anisotropy are parallel, it is not intended that this restriction be implied. It is quite possible by proper arrangement of cores and signal lines to employ transverse field switching of the readout core as compared to the longitudinal field switching utilized in the illustrated embodiment. Also, it is not essential to the operation of this invention that all of said three magnetic film cores possess the property of uniaxial anisotropy. The readout core need not have a discrete anisotropic axis to provide an output signal although such axis does provide an output signal having an optimum signal to noise ratio. Further, although each core, i.e., bias, information, or readout core, of the illustrated embodiment of this invention is depicted and explained as a single, integral unit each core may be built up of one or more layers of thin magnetic films, the net effect of which is that of a single core.

Figure 4:
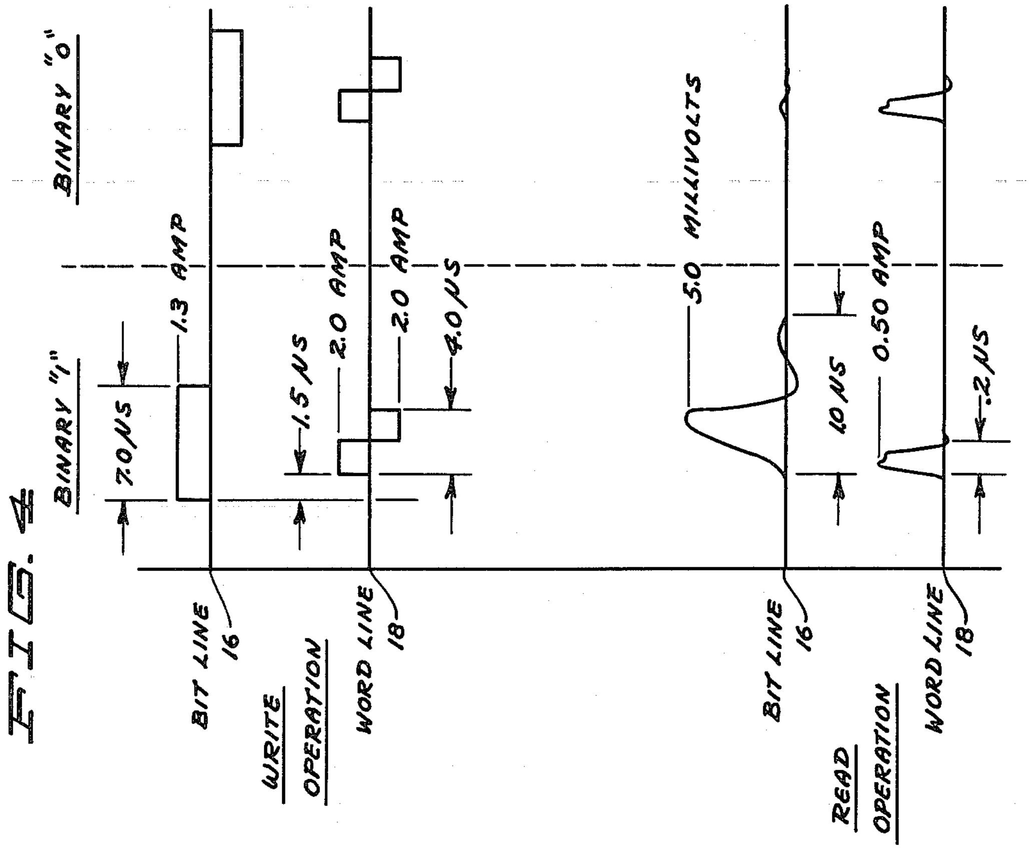
FIGURE 4 is an illustration of the interrogate-write-output signals using the arrangement of FIGURE 3.
Figure 3:
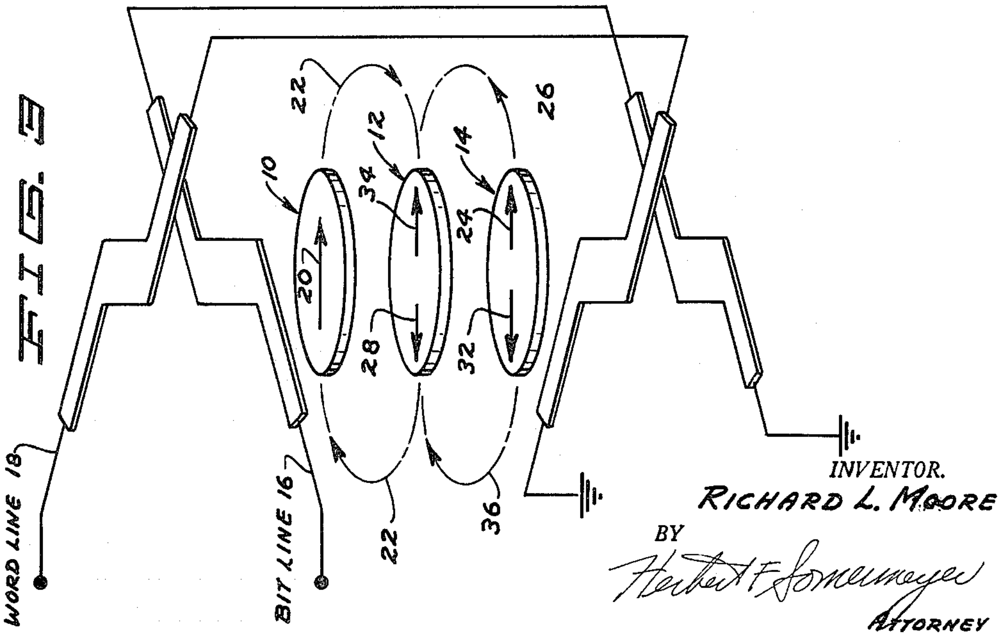
FIGURE 3 is an illustration of the element of FIGURE 1 omitting the substrate and insulators with a suitable interrogate-write line arrangement.

*Detailed description of operation.*—FIGURE 3 depicts a schematic illustration of the magnetic memory element with the insulators and substrates omitted for clarity. Cores 10, 12, and 14 are shown as circular wafers with signal lines 16 and 18 shown as continuous conductors passing over and returning under the stacked cores. Bias core 10 is initially permanently magnetized in one of its two remanent magnetic states denoted by vector 20 which in turn sets up its external remanent magnetic field 22. A binary "0" write signal conforming to FIGURE 4 is applied to bit line 16 and word line 18 so as to set information core 14 in the magnetic state denoted by vector 24. Upon cessation of the write operation the external remanent magnetic field 26 set up by core 14 in the area of the readout core 12 coerces the low coercive force core 12 into magnetic alignment, denoted by vector 28. This operation is represented by FIGURE 5 wherein the magnetic state of core 12 is established on its hysteresis characteristic loop 30 at point $P_1$ by the external remanent magnetic field set up by core 10. Point $P_1$ is the permanent magnetic bias point about which the magnetic state of core 12 is operated when affected by the magnetic fields set up by lines 16 and 18 and core 14. A binary "0" write pulse conforming to FIGURE 4 sets core 14 into the magnetic state denoted by vector 24 which in turn sets up external remanent magnetic field 26. Field 26 acting in combination with field 22 sets the magnetic state of core 12 at point $P_2$ on loop 30. Now an interrogate pulse conforming to FIGURE 4 is impressed upon word line 18 which sets up a magnetic field in the area of core 12 which when acting in combination with fields 22 and 26 merely moves the magnetic state of core 12 along the substantially horizontal portion of loop 30. This creates a negligible flux change throughout core 12 which in turn creates a negligible magnetic field variation linking bit line 16 with a resulting negligible output signal as denoted by FIGURE 4. If a binary "1" write signal conforming to FIGURE 4 is now applied to lines 16 and 18, core 14 is set in the magnetic state denoted by vector 32. Upon cessation of the write signal the external remanent magnetic field set up by core 14 in the area of the readout core 12 coerces the low coercive force core 12 into magnetic alignment, denoted by vector 34. This operation is represented by FIGURE 6 wherein the magnetic state of core 12 is established on its hysteresis characteristic loop 30 at point $P_1$ by the external remanent magnetic field set up by core 10. A binary "1" write signal conforming to FIGURE 4 sets core 14 into the magnetic state denoted by vector 32 which in turn sets up external remanent magnetic field 36. Field 36 acting in combination with field 22 sets the magnetic state of core 12 at point $P_3$ on loop 30. Now an interrogate pulse conforming to FIGURE 4 is impressed upon word line 18 which sets up a magnetic field in the area of core 12 which when acting in combination with fields 22 and 36 moves the magnetic state of core 12 along the substantially horizontal portion of loop 30 into the area of high permeability denoted by portion 38. This creates a substantial flux change throughout core 12 which in turn creates a substantial magnetic field variation linking bit line 16 with a resulting substantial output signal as denoted by FIGURE 4.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. A magnetic memory element providing nondestructive readout of a magnetic core comprising three magnetic film cores each core having a substantially rectangular hysteresis characteristic, a first core having a high coercivity and initially permanently magnetized in one of its two remanent magnetic states, a second core having a relatively low coercivity, a third core having a relatively intermediate coercivity, said first and third cores having substantial external remanent magnetic fields in the area of said second core with the field of said first core being of equal or greater intensity than that of said third core.

2. The apparatus of claim 1 wherein the planes of said three cores are substantially parallel.

3. The apparatus of claim 1 wherein said three cores possess the property of uniaxial anisotropy with the magnetic axes thereof substantially parallel.

4. The apparatus of claim 1 wherein at least one of said three cores comprises a plurality of magnetic film cores.

5. The apparatus of claim 1 further including means magnetically coupling said cores for switching said second core only when said third core is in a first of its two remanent magnetic states.

6. The apparatus of claim 5 wherein said three cores possess the property of uniaxial anisotropy with the magnetic axes thereof and the magnetic axes of said magnetic coupling means substantially parallel.

7. A magnetic memory element providing nondestructive readout of a magnetic core comprising three magnetic film cores, each core having a substantially rectangular hysteresis characteristic, a first core having a relatively high coercivity and initially permanently magnetized in one of its two remanent magnetic states and having an external remanent magnetic field in the area of a second core of sufficient intensity to place the magnetic state of said second core in substantial magnetic saturation, said second core having a relatively low coercivity, a third core having a relatively intermediate coercivity and having an external remanent magnetic field in the area of said second core of sufficient intensity to place the magnetic state of said second core in substantial magnetic saturation, the external remanent magnetic field of said first core in the area of said second core being of equal or greater intensity than that of said third core.

8. The apparatus of claim 7 wherein the planes of said three cores are substantially parallel.

9. The apparatus of claim 7 wherein said three cores possess the property of uniaxial anisotropy with the magnetic axes thereof substantially parallel.

10. The apparatus of claim 7 wherein at least one of said three cores comprises a plurality of magnetic film cores.

11. Apparatus of claim 7 wherein the magnetic characteristics and relative dispositions of said three cores to each other are such that the intensity of the external remanent magnetic field of said first core in the area of said third core is insufficient to substantially affect the magnetic state of said third core, the intensity of the external remanent magnetic field of said third core in the area of said first core is insufficient to substantially affect the magnetic state of said first core, and the intensity of the external remanent magnetic field of said second core in the area of said first or third core is insufficient to substantially affect the magnetic state of said first or third core.

12. A magnetic memory element providing nondestructive readout of a magnetic core comprising: three magnetic film cores, each core having a substantially rectangular hysteresis characteristic, a first core having a high coercivity and initially permanently magnetized in one of its two remanent magnetic states, a second core having a relatively low coercivity, a third core having a relatively intermediate coercivity, each of said first and third cores having external remanent magnetic fields of sufficient intensities in the area of said second core to place the magnetic state of said second core in substantial magnetic saturation, said external remanent magnetic field of said first core in the area of said second core being of equal or greater intensity than that of said third core; magnetic coupling means providing an interrogating magnetic field in the area of said second core of substantially opposite magnetic sense or subtractive from that of said first core and of such intensity such that when the external remanent magnetic fields of said first and third cores in the area of the second core are subtractive the magnetic state of said second core shall be driven substantially into its area of high permeability but when the external remanent magnetic fields of said first and third cores in the area of the second core are additive the magnetic state of said second core shall merely be driven along the substantially horizontal portion of its hysteresis characteristic loop and not substantially into its area of high permeability, said interrogating magnetic field being of insufficient intensity to substantially affect the magnetic state of said first or third core.

13. The apparatus of claim 12 wherein said three cores possess the property of uniaxial anisotropy with the magnetic axes thereof substantially parallel.

14. The apparatus of claim 12 wherein the magnetic axes of said cores and said magnetic coupling means are substantially parallel.

15. A magnetic memory element providing nondestructive readout of a magnetic core comprising: three magnetic film cores, each of said cores having a substantially rectangular hysteresis characteristic; a first core having a relatively high coercivity and initially permanently magnetized in one of its two remanent magnetic states; a second core having a relatively low coercivity; a third core having a relatively intermediate coercivity; first magnetic coupling means providing a magnetic field in the area of said third core which sets the magnetic state of said third core in a first or second of its two remanent magnetic states, said first or second remanent magnetic states of said third core setting up external remanent magnetic fields in the area of said second core; said first core setting up an external remanent magnetic field in the area of said second core of a direction which is additive to or subtractive from the external remanent magnetic fields set up by said third core, said additive or subtractive fields of said first and third cores setting the magnetic state of said second core in a first or second magnetic state; second magnetic coupling means providing a magnetic field in the area of said second core which if additive to the external remanent magnetic field of said third core in the area of said second core drives the magnetic state of said second core into its area of high permeability resulting in a substantial magnetic field variation about said second core but if subtractive from the external remanent magnetic field of said third core in the area of said second core merely drives the magnetic state of said second core along the substantially horizontal portion of its hysteresis characteristic loop resulting in an insubstantial magnetic field variation about said second core; third magnetic coupling means intercepting said magnetic field variations; said magnetic field variations inducing a substantial or insubstantial output signal in said third magnetic coupling means with said output signal indicating that said third core is in a first or a second of its two remanent magnetic states; the magnetic state of said third core substantially unaltered by the magnetic field provided by said second magnetic coupling means.

16. The apparatus of claim 15 wherein said three cores possess the property of uniaxial anisotropy with the magnetic axes thereof substantially parallel.

17. The apparatus of claim 15 wherein the magnetic axes of said cores and said magnetic coupling means are substantially parallel.

18. A magnetic memory element providing nondestructive readout of a magnetic core comprising: three magnetic film cores and at least two magnetic coupling means; each of said cores having a substantially rectangular hysteresis characteristic and possessing the property of uniaxial anisotropy; a first core having a relatively high coercivity and initially permanently magnetized in one of its two remanent magnetic states and having an external remanent magnetic field in the area of a second core of sufficient intensity to place the magnetic state of said second core in substantial magnetic saturation; said second core having a relatively low coercivity; a third core having a relatively intermediate coercivity and having an external remanent magnetic field in the area of said second core of sufficient intensity to place the magnetic state of said second core in substantial magnetic saturation; the external remanent magnetic field of said first core in the area of said second core being of equal or greater intensity than that of said third core; the magnetic axes of said cores and magnetic coupling means being substantially parallel; first and second magnetic coupling means passing over and returning under said three cores; said cores disposed in a stacked parallel plane relationship; said first magnetic coupling means providing a conducting path for a unipolar current pulse; said second magnetic coupling means providing a conducting path for a bipolar current pulse; said unipolar current pulse overlapping said bipolar current pulse to provide coincident current pulses; the combination of said unipolar current pulse of a first polarity and said bipolar current pulse setting up a magnetic field in the area of said third core which sets the magnetic state of said third core in a first of its two remanent magnetic states; the combination of said unipolar pulse of a second polarity and said bipolar pulse setting up a magnetic field in the area of said third core which sets the magnetic state of said third core in a second of its two remanent magnetic states; said first or second remanent magnetic states of said third core setting up external remanent magnetic fields in the area of said second core; said first core setting up an external remanent field in the area of said second core of a direction which is additive to or subtractive from the external remanent magnetic fields set up by said third core; said additive or subtractive fields of said first and third cores setting the magnetic state of said second core in a first or second magnetic state along the same substantially horizontal portion of its hysteresis characteristic loop; said second magnetic coupling means providing a conducting path for a unipolar interrogating pulse which in turn sets up a magnetic field in the area of said second core which if additive to the external remanent magnetic field of said third core in the area of said second core drives the magnetic state of said second core into its area of high permeability resulting in a substantial magnetic field variation about said second core, but if subtractive from the external remanent magnetic field of said third core in the area of said second core merely drives the magnetic state of said second core along the substantially horizontal portion of its hysteresis characteristic loop and not substantially into its area of high permeability resulting in an insubstantial magnetic field variation about said second core; said first magnetic coupling means intercepting the said substantial or insubstantial magnetic field variations; said substantial or insubstantial magnetic field variations including a substantial or insubstantial output signal in said first magnetic coupling means; said substantial or insubstantial output signal indicating that said third core is in a first or a second of its two remanent magnetic states; the magnetic state of said third core substantially unaltered by the magnetic field set up by said unipolar interrogating pulse.

19. A magnetic memory element providing nondestructive readout of a magnetic core comprising: three magnetic film cores, each of said cores having a substantially rectangular hysteresis characteristic and possessing the property of uniaxial anisotropy, a first core having a relatively high coercivity and initially permanently magnetized in one of its two remanent magnetic states, a second core having a relatively low coercivity, a third core having a relatively intermediate coercivity; the external remanent magnetic field of said first core in the area of said second core being of equal or greater intensity than that of said third core; first and second magnetic coupling means, said first magnetic coupling means providing a conducting path for a unipolar pulse, said second magnetic coupling means providing a conducting path for a bipolar pulse, said unipolar pulse overlapping said bipolar pulse to provide coincident pulses; the combination of said unipolar pulse of a first polarity and said bipolar pulse setting up a magnetic field in the area of said third core which sets the magnetic state of said third core in a first of its two remanent magnetic states; the combination of said unipolar pulse of a second polarity and said bipolar pulse setting up a magnetic field in the area of said third core which sets the magnetic state of said third core in a second of its two remanent magnetic states; said first or second remanent magnetic states of said third core setting up external remanent magnetic fields in the area of said second core; said first core setting up an external remanent field in the area of said second core of a direction which is additive to or subtractive from the external remanent magnetic field set up by said third core; said additive or subtractive fields of said first and third cores setting the magnetic state of said second core in a first or second magnetic state; said second magnetic coupling means providing a conducting path for a unipolar interrogating pulse which in turn sets up a magnetic field in the area of said second core which if additive to the external remanent magnetic field of said third core in the area of said second core drives the magnetic state of said second core into its area of high permeability, but if subtractive from the external remanent magnetic field of said third core in the area of said second core merely drives the magnetic state of said second core along the substantially horizontal portion of its hysteresis characteristic loop; said first magnetic coupling means intercepting magnetic field variations about said second core; said magnetic field variations inducing an output signal in said first magnetic coupling means with said output signal indicating that said third core is in a first or a second of its two remanent magnetic states; the magnetic state of said third core substantially unaltered by the magnetic field set up by said unipolar interrogating pulse.

20. A magnetic memory element providing nondestructive readout of a magnetic core comprising: three magnetic film cores each of said cores having a substantially rectangular hysteresis characteristic; a first core having a relatively high coercivity and initially permanently magnetized in one of its two remanent magnetic states and having an external remanent magnetic field in the area of a second core of sufficient intensity to place the magnetic state of said second core in substantial magnetic saturation; said second core having a relatively low coercivity; a third core having a relatively intermediate coercivity; the external remanent magnetic field of said first core in the area of said second core being of equal or greater intensity than that of said third core; the magnetic axes of said first and third cores being substantially parallel; said cores disposed substantially in a stacked parallel plane relationship; means for providing a first magnetic field in the area of said third core substantially parallel to said magnetic axis of said third core; said first magnetic field setting the magnetic state of said third core in a first or a second of its two remanent magnetic states; said remanent magnetic states of said third core setting up external remanent magnetic fields in the area of said second core; said first core setting up an external remanent field in the area of said second core of a direction which is additive to or subtractive from the external remanent magnetic fields set up by said third core; said additive or subtractive fields of said first and third cores setting the magnetic state of said second core in a first or second magnetic state; means for providing a second magnetic field in the area of said second core, said second magnetic field substantially parallel to said magnetic axis of said second core; said second magnetic field if additive to the external remanent magnetic field of said third core in the area of said second core drives the magnetic state of said second core into its area of high permeability resulting in a substantial magnetic field variation about said second core, but if subtractive from the external remanent magnetic field of said third core in the area of said second core merely drives the magnetic state of said second core along the substantially horizontal portion of its hysteresis characteristic loop and not substantially into its area of high permeability resulting in an insubstantial magnetic field variation about said second core; means for intercepting said magnetic field variations and inducing a substantial or insubstantial output signal in said intercepting means with said output signal indicating that said third core is in a first or a second of its two remanent magnetic states; the magnetic state of said third core substantially unaltered by said second magnetic field.

21. The apparatus of claim 20 wherein said first and third cores possess the property of uniaxial anisotropy.

22. A magnetic memory element providing nondestructive readout of a magnetic core comprising: a plurality of magnetic coupling means; three magnetic film cores, each of said cores having a substantially rectangular hysteresis characteristic; a first core having a relatively high coercivity and initially permanently magnetized in one of its two remanent magnetic states; said second core having a relatively low coercivity; a third core having a relatively intermediate coercivity; the external remanent magnetic field of said first core in the area of said second core being of equal or greater intensity than that of said third core; the magnetic axes of said cores and magnetic coupling means being substantially parallel; first magnetic coupling means providing a conducting path for a unipolar pulse; second magnetic coupling means providing a conducting path for a bipolar pulse; said unipolar pulse overlapping said bipolar pulse to provide coincident pulses; the combination of said unipolar pulse and said bipolar pulse setting up a magnetic field in the area of said third core which sets the magnetic state of said third core in a first or second of its two remanent magnetic states; said first or second remanent magnetic states of said third core setting up external remanent magnetic fields in the area of said second core; said first core setting up an external remanent magnetic field in the area of said second core of a direction which is additive to or subtractive from the external remanent magnetic fields set up by said third core, setting the magnetic state of said second core in a first or second magnetic state; said first magnetic coupling means providing a conducting path for a unipolar interrogating pulse which in turn sets up a magnetic field in the area of said second core which if additive to the external remanent magnetic field of said third core in the area of said second core drives the magnetic state of said second core into its area of high permeability resulting in a substantial magnetic field variation about said second core, but if subtractive from the external remanent magnetic field of said third core in the area of said second core merely drives the magnetic state of said second core along the substantially horizontal portion of its hysteresis characteristic loop resulting in an insubstantial magnetic field variation about said second core; magnetic coupling means intercepting the said substantial or insubstantial magnetic field variations; said magnetic field variations inducing an output signal in said first magnetic coupling means with said output signal indicating that said third core is in a first or a second of its remanent magnetic states; the magnetic state of said third core substantially unaltered by the magnetic field set up by said unipolar interrogating pulse.

23. The method of detecting the state of remanent magnetization of a magnetic element having at least two stable remanent magnetic states, comprising intercepting a portion of the external remanent magnetic field of the element by a magnetic core, applying a magnetic field in the core in a first determined direction, applying a momentary magnetic field in the core in a second predetermined direction such that the magnetic state of the core is momentarily and substantially altered when the element is in a first magnetic state and insubstantially altered when the element is in a second magnetic state, and sensing the magnetic state change in the core.

24. The method of detecting the magnetic state of a first magnetic element having two stable remanent magnetic states comprising applying a first magnetic field in the area of a second magnetic element of a magnetic direction arbitrarily denoted as positive, applying a second magnetic field in the area of said second magnetic element wherein said second magnetic field is of a positive magnetic direction when said first magnetic element is in a first stable remanent magnetic state and said second magnetic field is of a negative magnetic direction when said first magnetic element is in a second stable remanent magnetic state, applying a third magnetic field in the area of said second magnetic element of a negative magnetic direction which when combined with said second magnetic field of a negative magnetic direction drives the magnetic state of said second magnetic element from that of substantial saturation into a condition of high permeability producing a substantial magnetic field variation thereabout, applying said third magnetic field in the area of said second magnetic element of a negative magnetic direction which when combined with said second magnetic field of a positive magnetic direction merely drives the magnetic state of said second magnetic element along the substantially horizontal portion of its hysteresis characteristic loop denoting substantial magnetic saturation and producing an insubstantial magnetic field variation thereabout, said substantial or insubstantial magnetic field variation indicating the magnetic state of said first magnetic element.

25. The method of detecting the state of remanent magnetization of a magnetic element having at least two stable remanent magnetic states comprising: intercepting a portion of the external remanent magnetic field of the element by a first magnetic core; applying the external remanent magnetic field of a second magnetic core to said first magnetic core in a first determined direction; applying a momentary magnetic field to said first magnetic core in a second and opposite direction such that the magnetic state of said first magnetic core is momentarily and substantially altered when the element is in a first magnetic state and insubstantially altered when the element is in a second magnetic state and sensing the magnetic state change in said first magnetic core.

26. The method of detecting the magnetic state of a magnetic memory element having at least two stable remanent magnetic states comprising: applying the external remanent magnetic field of the element in the area of a first magnetic core in a first or second opposite direction indicative of a first or second magnetic state, respectively; applying the external remanent magnetic field of a second magnetic core in the area of said first magnetic core in said first direction; applying a momentary magnetic field in the area of said first magnetic core in said second direction such that the magnetic state of said first magnetic core is momentarily and substantially altered when the element is in said second magnetic state and insubstantially altered when said element is in said first magnetic state, and sensing the magnetic state change in said first magnetic core.

References Cited in the file of this patent

UNITED STATES PATENTS 2,960,685 Van der Heide ---------- Nov. 15, 1960

FOREIGN PATENTS 845,604 Great Britain ----------- Aug. 24, 1960

OTHER REFERENCES

Pub. I, Coincident, Current Nondestructive Readout, from This Magnetic Films, by Oakland and Rossing, Journal of Applied Physics, supplement to vol. 30, No. 4, April 1959, pp. 54S and 59S.